US006846980B2

(12) United States Patent
Okulov

(10) Patent No.: US 6,846,980 B2
(45) Date of Patent: Jan. 25, 2005

(54) ELECTRONIC-ACOUSTIC GUITAR WITH ENHANCED SOUND, CHORD AND MELODY CREATION SYSTEM

(76) Inventor: Paul D. Okulov, 3574 Blvd. St. Joseph, Lachine, Quebec (CA), H8T 1P7

( * ) Notice: Subject to any disclaimer, the term of this patent is extended or adjusted under 35 U.S.C. 154(b) by 146 days.

(21) Appl. No.: 10/059,302

(22) Filed: Jan. 31, 2002

(65) Prior Publication Data

US 2002/0148346 A1 Oct. 17, 2002

Related U.S. Application Data

(60) Provisional application No. 60/265,085, filed on Jan. 31, 2001.

(51) Int. Cl.[7] .................... G01H 1/18

(52) U.S. Cl. .................... 84/646; 84/613; 84/731; 84/738

(58) Field of Search .................... 84/613, 746, 600–606, 84/646, 723–726, 730–731, 737–738

(56) References Cited

U.S. PATENT DOCUMENTS

| | | | | |
|---|---|---|---|---|
| 4,630,520 A | * | 12/1986 | Bonanno | 84/655 |
| 5,040,447 A | * | 8/1991 | Murata et al. | 84/612 |
| 5,121,669 A | * | 6/1992 | Iba et al. | 84/735 |
| 5,153,364 A | * | 10/1992 | Uchiyama et al. | 84/742 |
| 5,442,986 A | * | 8/1995 | Cota | 84/267 |
| 5,557,057 A | * | 9/1996 | Starr | 84/617 |
| 6,191,348 B1 | * | 2/2001 | Johnson | 84/485 R |
| 6,191,350 B1 | * | 2/2001 | Okulov et al. | 84/646 |

* cited by examiner

*Primary Examiner*—Jeffrey W. Donels

(57) ABSTRACT

An electronic battery operated and self contained acoustic guitar allowing playing back high quality prerecorded notes through its own soundboard electromechanically activated by a piezoelectric vibrating means. The guitar allows to play chords or melody with simplified fingering and provides trigger events (note ON, Off, velocity of the note played) with less than 15 ms delay. When the guitar is not powered it can be played as a normal high quality musical instrument.

14 Claims, 14 Drawing Sheets

Block-Diagram

General Configuration of Software

Low Level Interrupt Routine and String Read Timing Example

| Cut-Off Low Pass Input Filters Frequencies, kHz (example) | | | | | | |
|---|---|---|---|---|---|---|
| String # | 1 | 2 | 3 | 4 | 5 | 6 |
| Cut-Off Frequency | 4.0 | 3.4 | 2.8 | 2.2 | 1.6 | 1.0 |

ELECTRONIC-ACOUSTIC GUITAR WITH ENHANCED SOUND, CHORD AND MELODY CREATION SYSTEM

This application claims priority from the U.S. provisional application No. 60/265,085, filed Jan. 31, 2001 (Inventor: Paul D. Okulov, CA.)

FIELD OF THE INVENTION

The present invention generally relates to musical stringed instruments, particularly those able to play melody and chords with simplified fingering and more specifically electronic guitars. This invention can also be used as MIDI input devices and in addition relates to the methods of operating a guitar controller and processing input data from the strings in order to determine "On-Off" and "Velocity" condition for an electronic music synthesizer.

BACKGROUND OF THE INVENTION

Stringed instruments in a form of MIDI controllers are well known. For instance, the basic configuration may consist of a guitar (U.S. Pat. Nos. 5,619,003; 5,396,828; 4,630,520, etc.) like device with emulation of the strings and frets (U.S. Pat. Nos. 5,398,585; 5,033,351; etc.)

The fret board of the guitar in electronic version is normally used as a switching device and string vibration picked up by input sensors and processed in order to determine trigger and velocity events for initiating specific note or groups of notes in accordance with minute state of the fingerboard switches. These instruments generally may have electronic micro processing unit/s (CPU), scanning device for determining the position of the finger and synthesizer and/or MIDI compatible output. Some devices include internal amplifier and a speaker that allow to play the instrument without external audio system.

In addition there are well known electric-acoustic guitars which allow to play it in a normal acoustic mode or with external amplifier-speaker system. These guitars do not offer electronic chord creation by depressing just one fret and do not have means for reproducing a sound in electronic mode. It is important to mention that about 90% of first time guitar buyers are giving up their efforts within the first month of practicing because of difficulties associated with playing chords and particularly its fingering.

Stringed instruments with simplified fingering for creation of chords or so-called easy to play guitars are well known from the prior art. One of the earliest attempts to create a simple fingering device for chord creation was a "Guitarola™"—a mechanical device that was to be attached to the guitar neck above the strings. Using just one finger, the player could create a variety of chords predetermined by a mechanical configuration of the device design. This device was generally difficult in use and it offered only limited number of chords to be played. In addition the guitar itself needed to be always properly tuned.

There also electronic guitars known which allow easy fingerings (for instance a U.S. patent application Ser. No. 09/496,040; Okulov et al.) The idea of easy to play instrument lies in providing initial and successful experience in playing guitars and teaching a user the skills necessary for playing a normal instrument. This device comprise a finger position recognition system, strings' sensors, CPU, memory and memorized notes, melody and chord tables and audio output means. Pressing a single finger allow to designate a chord and strumming strings allows to play full chords or to play melody notes depending on a status of the operation of the device.

In order to reduce the loudness of the sound of the strings when used as a triggering device, many of the designs mentioned above have mechanical means for string damping made in a form of soft rubberlike foams or gel contacting strings directly near the bridge. These dampers can significantly reduce the audio output of the vibrating string. The disadvantage of such devices is that having mechanically damped the string, its normal oscillations are distorted and therefore provide no input information from the strings on a status of its vibration after note ON event. That makes playing of such instrument unnatural, especially when note ON or muting is desired. There are technical solutions where the bridge can be disconnected from the sound board (U.S. Ser. No. 09/496,040; Okulov et al.) However the presence of moving parts complicates the overall design of the guitar and is a potential source of buzzes and unreliable behavior during the operation.

There are also devices known from the prior art which are to provide audio signal by means of internal speaker (mostly used in toy guitars and travel type electric guitars.) Because of the limited space and weight considerations, speaker quality normally is severely compromised and its output is unacceptable from the point of view of quality of the sound.

The limitation of these instruments however exists that switching is needed between melody and chord mode which distracts attention of the player and creates delay. Another source of problem is the fact that these instruments use MIDI protocol for note generation and require employment of a synthesizer which create delays in generating note ON-OFF events and determination of velocity of the signal. Still another disadvantage of the prior art instruments is significant weight of the instrument and elevated power drain due to use of conventional speakers.

The prior art also include guitars employing various transducers attached to the sound board and used for sustaining of the signal picked up from the strings, however these devices neither provide creation of the high quality sound through the guitar's own sound board, nor do they provide transducer means employing low power drain vibrating piezoelectric systems.

The difference between a guitar as a stringed instrument, for example a piano, in terms of the complexity of note ON-OFF and velocity generation process is that before the piano key hits the mechanism of the hammer or electric switch and the sound is created it is possible to estimate the velocity of the moving key and to apply it to the corresponding generated note before the key provides ON or OFF event. Contrary, in case of guitars, when the string is released by plucking, strumming or hammering by fingers or a pick, the velocity of this given string is not determined yet but the sound is ON already. This is why the note ON event always comes with delay and even the best guitar MIDI instruments provide delays more than 30 ms which are still quite noticeable for experienced player or listener.

There are several methods known from the prior art which include differentiation of the input signal from the strings in order to determine note ON or OFF event (U.S. Pat. Nos. 4,939,471; 5,710,387; 6,091,013). These methods are particularly useful in recognition of the start of the note in case of percussion or plucked musical instruments, in the case of which an envelope curve following function is formed from an audio signal, a comparison variable is formed from a current value of the envelope curve following function and a predecessor value corresponding to an earlier value, and the start of a note is defined at a point in time at which the comparison value exceeds a threshold value. Being analog or digital in its nature these methods however do not teach methods of determination of the velocity of the note simultaneously or within reasonable delay with note ON event or the negative velocity (speed of muting or decaying) when the string is stopped, muted or dumped. In addition the influence of small changes in compared values of the envelope signal provides great amount of false triggering and makes these methods unreliable. Another disadvantage is the fact that these instruments do not teach pitch control techniques which would be a natural and important value necessary to create realistically sounding and easy to play electronic-acoustic guitar.

All of these disadvantages are overcome in present invention.

SUMMARY OF THE INVENTION

The objectives of present invention are to create a low weight, cost and power consumption self contained acoustic-electronic guitar providing for a player an ability to access most of the chords and melody scales with simple fingering and to reproduce the high quality sound through the guitar's own sound board (or a remote sound box with sound board which can be operated through a cable or radio frequency transmitting device, for instance an FM link for feeding audio signal from the guitar played to the sound box) with trigger delays less than 30 ms and preferably less than 15 ms and with full velocity sensitivity. Another objective is to further reduce the cost of the device, particularly by eliminating a stand alone synthesizer, simplifying string sensing input A/D converting device, and providing the highest quality of notes' recreation by means of memorizing a full size note sample in a memory, and to create possibility of interactive playing of the instrument using a computer or a network connection through a PC link and to provide downloadable software and upgrades. It is still another objective of present invention to provide an improved melody-chord automated recognition system based on logical analyzing of the pattern of playing and eliminating need for switching between chord and melody modes. Another objective is to create a pitch control system able to recognize changes in the pitch of the string activated and translate it into corresponding pitch of the note played which would allow more realistic playing techniques to be used, for instance bending.

The instrument as per present invention comprise an acoustic guitar body having wired frets and metal or electro conductive (metal wounded Nylon, polymer, etc.) strings which together with frets create a matrix of contacts-switches. Strings at the bridge can have six individual piezo or electromagnetic pick ups with sufficient channel separation (cross channel signal contamination less than 7% is desirable.) The six piezo elements comprise a strings sensing mean. Its output is fed to six pre-amplifiers with individually adjusted low pass filters which eliminate most of the higher harmonics of the vibrating strings and beatings due to reflection/resonant acoustic waves transmitted from the guitar body and provide almost clean fundamental frequency signal for further processing and analyzing.

The cut-off frequency and quality of these filters are adjusted to a specific string behavior and interaction with guitar body and provide an effective filtering for most of the natural higher harmonics for the given string length (a range of the string's spans between the open string and the shortest length of the string when fretted.) After the pre-amplifiers and the filters the signals are multiplexed, preferably into two channels compatible with standard stereo of audio digitizing equipment (codec devices used in PCS, for instance), then digitized and processed by a CPU.

Strings as electric current conductors are used to provide scanning logic signals to the frets when any finger or finger combination is applied, leaving otherwise the strings grounded which additionally helps to eliminate an accumulation of the static charge on player's hands.

Preferably the full length and high quality notes samples are kept in the memory bank/s. It is desirable to have all open note samples and at least every third fretted notes in order to provide a realistic playback. It is still desirable to have several layers of the notes samples depending on the velocity and method of playing to have notes, for instance, with buzzes normally related to high velocity/amplitude levels of playing or to have additional modulating sounds for emulating such sounds by layering it over the notes played back when such condition is determined by input strings sensors and a CPU.

The problem of undue inflating of the memory size in this case can be overcome by several means. First, the fretted notes can be interpolated based on the pitch of the note to be played which provides reduction in the number of notes to be memorized. In another approach the note's sample can be digitized at different resolution depending on the stage of the note played (attack, sustain, decay portion.) Higher amount of harmonics normally occur at the attack and sustain portions of the note, as well as are they related to the signals with higher amplitude. Thus, these stages of the signal for example can be digitized at 16 bits and the rest of the signal at 8 bits resolution. Different sampling rates can be applied, for instance a 40.1 kHz at the beginning of the note and down to 10.025 kHz at sustain or decay portion of the note, etc.

Sustain and decay portions of the note can be successfully and indefinitely emulated by looping of one or two waves of the signal's "tale." As the amount of the memory is proportional to the sampling rate of the sound's digital output it is basically apparent that for the quality sound it is necessary to have at least 40.1 kHz sampling rate frequency at 16 bit. However, due to the fact that the instrument as per present invention has a piezo activated sound board which can reproduce guitar sounds with all its natural richness through natural means (a sound board), it becomes possible to reduce sampling rate to 20.05 kHz with no compromise to the quality of the sound.

A standard sound port like AD1845 device or alike can be employed for digitizing of the two channel input signal from the multiplexer and further feeding it to the CPU, which recreates six channel signals ready for processing. The following stages of processing are very important from the point of view of determination of the state of the string:

In order to rectify the input signal, the DC offset level is determined on a minute basis as accumulated or, for better results, as a sliding average of the signal's prior values (when only limited number of previous values are taken into consideration.) The difference between this average and the signal is then determined by subtracting it from the signal and putting the absolute values of the results together as a rectified envelope signal. This differs from the prior art methods which teach taking pick to pick values or imposing constant (initial) offset value to be subtracted. The first has a disadvantage of being too late for the note ON event determination, as, for instance, the low "E" guitar string produces one full oscillation with 8 ms delay already. For a reliable processing several pick to pick values will be needed which does not allow to achieve a desired speed of note ON recognition. The constant offset technique also has the disadvantage of introducing a significant error when the string is pulled or bent which leads to distortion of rectified envelope signal and unreliable trigger event detection.

Applying low pass filter techniques for the digitized envelope analysis known from the prior art (U.S. Pat. No. 5,710,387) also creates delays in the processing due to significant computing power needed. Therefore sliding averaging of the envelope signal is used in present invention where the number of values to be averaged starts from 1 and up to 5–10 values prior to the minute (analyzed or rectified) value of the signal. A simple arithmetic operation is then just needed for emulating a full effect of a low pass filter.

A standard computing techniques employing the equation like can also be used.

$$\bar{y}_i = \left(\frac{255}{256} * \bar{y}_{(i-1)}\right) + \frac{y_i}{256},$$

Where $\bar{y}$ – mean value of $y$.

In order to determine the note ON event, the difference between adjacent values of the envelope signal are taken, but spaced apart at the specific distance provided by an auto correlation function of the given string oscillations and therefore helping to avoid analyzing the picks of the envelope which are generally correlated with specific harmonic frequencies of the given string and its length. For instance, with sampling rate of data acquisition at 233 Hz per input channel, the optimum distance would be approximately 5 values prior to the analyzed value.

A different threshold value then is established for each string depending on the pick up output and pre amplifier-filter gain, its reaction with guitar body and pre amplifier's gain. When the difference signal crosses the threshold level in a positive direction and stays there for a predetermined amount of time, the event ON is generated and waiting state for a note OFF is established which, if expired or canceled by a string OFF event puts the string triggering algorithm into note ON waiting state again.

A very important part of present invention operation is determination of the string velocity which can reliably be detected from the maximum of the differential ("difference signal" in drawings and algorithms description) signal or specific points (maximum, minimum, zero crossing) of the first or second differential of the said envelope signal of the string vibration. That event normally happens in the middle of the attack portion of the envelope which basically occurs within 8–12 ms delay from the moment when the string starts to oscillate (released, hammered, etc.) In order to reduce this delay even further the method of constant monitoring of the amplitude of the envelope signal is used where the initial portion of the note play back is being brought up from the memory based on a preliminary estimation of the velocity from the speed of crossing of the threshold level by a differential signal or applying a preset velocity value and then modifying it on a fly when one of the two other events occur—a maximum of the differential signal is reached and/or the actual maximum of the string signal envelope is detected. This method allows providing extremely fast recognition of the note ON event and further modifying of the played back note velocity without noticeable change.

Good correlation between maximum of the differential signal and the maximum of the envelope signal amplitude is further shown which if implemented allows generation of the note velocity in MIDI format prior to the event when input signal actually reaches its maximum.

A negative threshold for the note OFF event is used and, again the signal has to cross it in a negative direction and stay there for a predetermined time in order to avoid false notes OFF. As the note OFF delay is not that critical as the note ON delay, it is possible to impose more severe check by this or other criteria to the note OFF. Accordingly, if the crossing back from the area below the negative threshold to the positive direction is detected before such time limit expires, the note OFF event is duly discarded before it actually generates the note OFF. It is still desirable to apply note OFF velocity which we called negative velocity in order to mute or stop the note naturally which can be detected in a similar manner as the velocity of the signal. In addition a double check on trigger events can be imposed when two thresholds can be established so when the signal is crossing for instance in positive direction it has to cross higher or lower level threshold in an opposite direction in order to create a status of waiting for another even (like note OFF, another note ON, etc.)

Another task is to avoid or reduce the feedback which occurs when the sound played back through the guitar sound board creates additional vibration of the strings and modulates it with the frequency determined by a chord or melody note generated. A separation of the neck from the guitar body can be used in order to reduce this feedback (detached or continuous neck). Another technique is to separate the sound board from the guitar body and create a separate sound box having its own sound board activated by a electromechanical transducer, piezo-electric device for example.

A piezo actuator with free weight (about 50% of sound board weight) attached to it by means of discrete elastic joint (at least three or four) is further shown as a preferable solution. This piezo element comprise a circular bending plate, which contacts the sound board by its middle portion through the link.

Pitch control technique includes activating time counter every time the first zero crossing of the input signal from the string after the note ON event is detected and comparison of current value with previous one or average of several previous values. The difference signal is then used to modify the pitch of the note played back from the memory. Therefore the initial pitch deviation is transformed into the pitch of play back memorized note which allows to provide bending and tremolo effects.

The detailed description of present invention is further illustrated by drawings and diagrams attached.

BRIEF DESCRIPTION OF THE DRAWINGS

The invention is described in the following text with reference to a preferred exemplary embodiment in conjunction with the drawings attached. The drawings include references to the portions of the text description related to it and will be formally numbered and described in more details in a utility patent application which will follow.

DETAILED DESCRIPTION OF THE PREFERRED EMBODIMENTS

Figure 1:
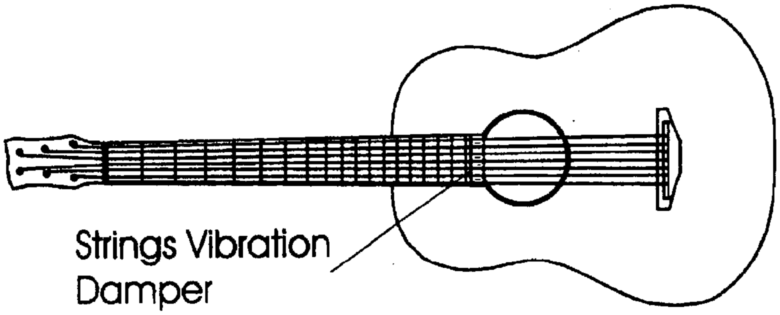
FIG. 1 shows an electronic acoustic version of the guitar where strings are muted by a removable damper.
Figure 2:
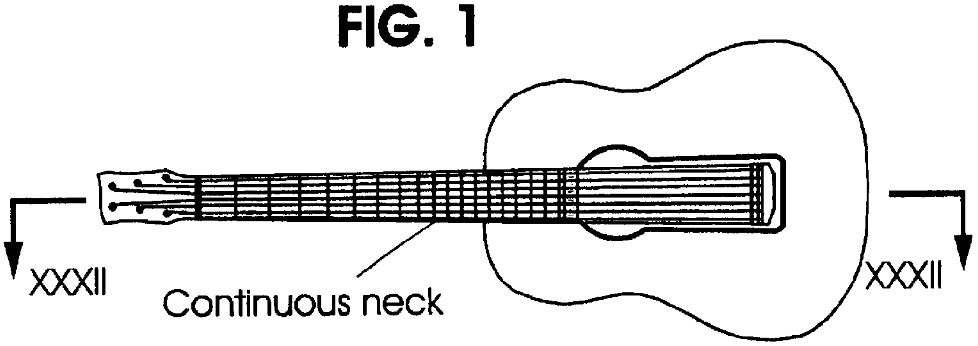
FIG. 2 illustrates a guitar with elongated neck separated from the sound board.
Figure 3:
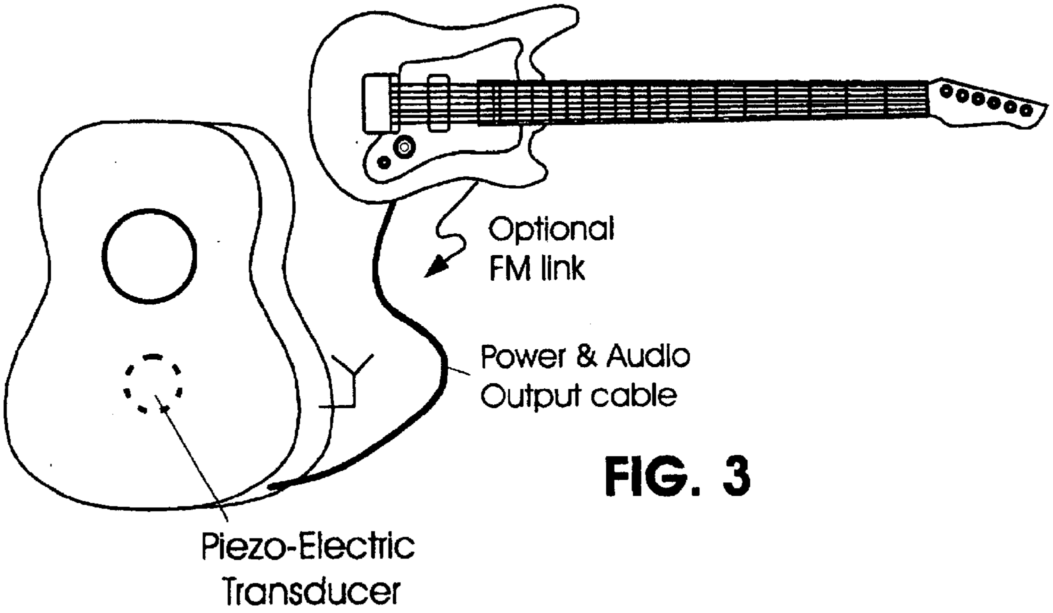
FIG. 3 provides configuration of remote guitar like sound box linked with the instrument by FM radio or cable.
Figure 4:
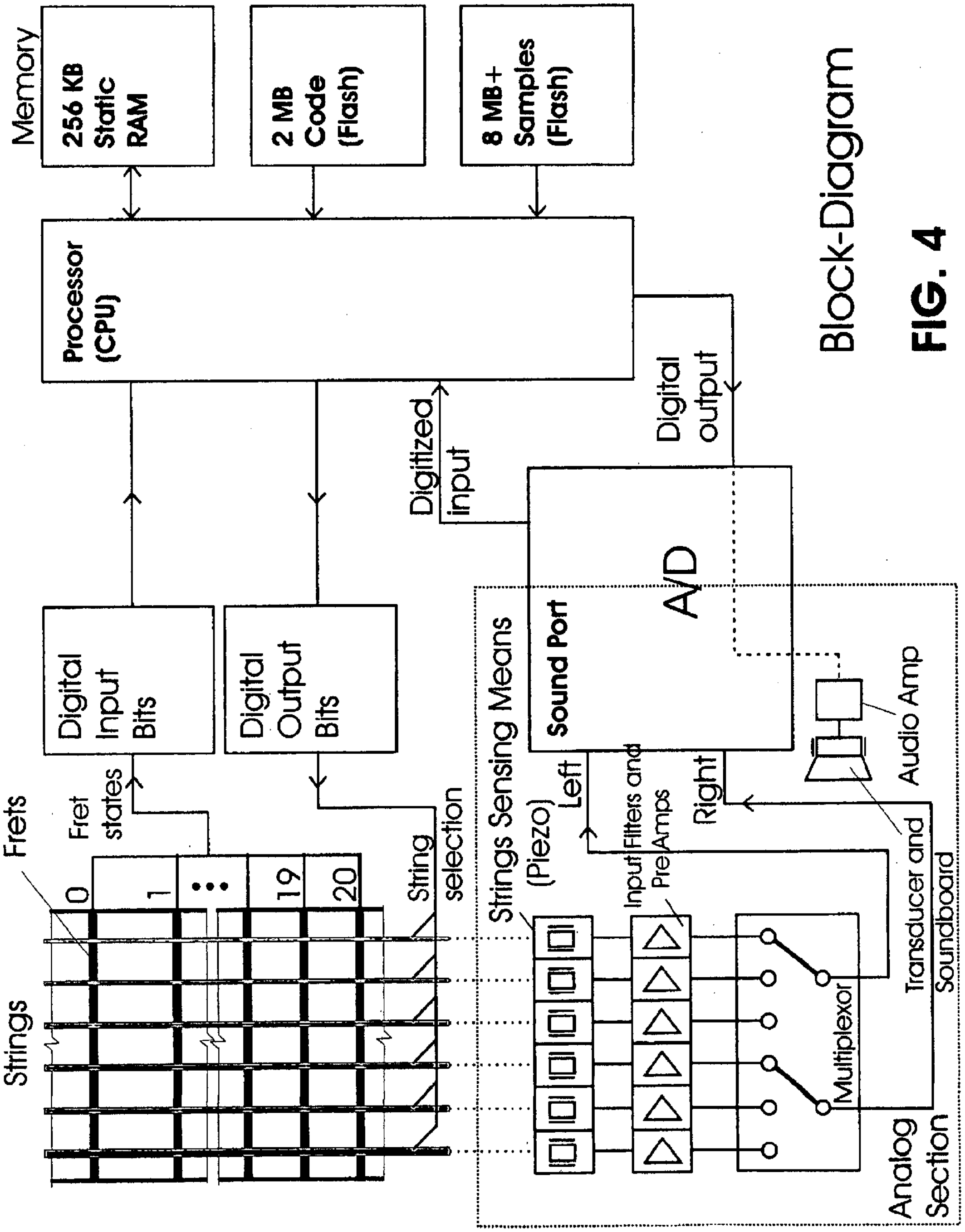
FIG. 4 presents a block diagram of the preferred embodiment.

General characteristic of the preferred embodiment (FIGS. 1–4) are as follows:

The guitar is a able to select a chord or a note to be played by depressing the string with one finger (more complex chords and extensions or slush chords may require two or maximum three fingers spaced apart no more than three adjacent strings or four frets); play a note by plucking the string or play a chord by strumming the strings starting from the string other than the one depressed by a finger or the higher string in two or three finger combination; provide feeling of naturally played guitar by recreating the velocity of the note proportionally to the force of the strumming or plucking; hear up to six simultaneous guitar sounds from the memorized guitar (or other instruments) samples at sampling rate of at least 20.05 kHz; select several modes like easy to play mode, normal guitar tuning, etc.; adjust the volume and the trigger thresholds levels. The guitar as per present invention is self contained and does not require external computing means, it is downloadable, the chord/melody maps and note samples can be changed.

The CPU choice can be Motorola ColdFire™ 5206 running at 33 MHz. For digitizing of string pick ups signals and producing sound (A/D and D/A converting and analog filtering) a standard device like Analog Devices 1845 stereo sound "codec" can be used.

For multiplexing input signals and Analog Device ADG409 analog multiplexer can be employed with up to 4 pairs of inputs multiplexed to one pair of outputs (FIGS. 7–10) compatible with AD1845 stereo inputs can be used.

Memory means, for instance 2 meg of flash ROM to store the code, around 8 meg of flash ROM for sound banks to store notes samples, 256 Kb of static RAM.

The sampling rate for A/D and D/A conversion can be established at 22.05 kHz or to be variable depending on the stage of note played as described above.

The wired fret scanning technique includes the steps of applying power to one string (FIG. 4) at the time and reading fret status by reading bits 0 to 20 of the digital inputs. It can be done in negative logic where reading 0 will mean contact between given string and fret. A denouncing algorithm and read delay can be introduced to let the string-fret contact to stabilize and prevent back to forth switching. In order to avoid confusion when one finger can create a contact with two or one fret, special logic algorithm can be introduced.

Figure 5:
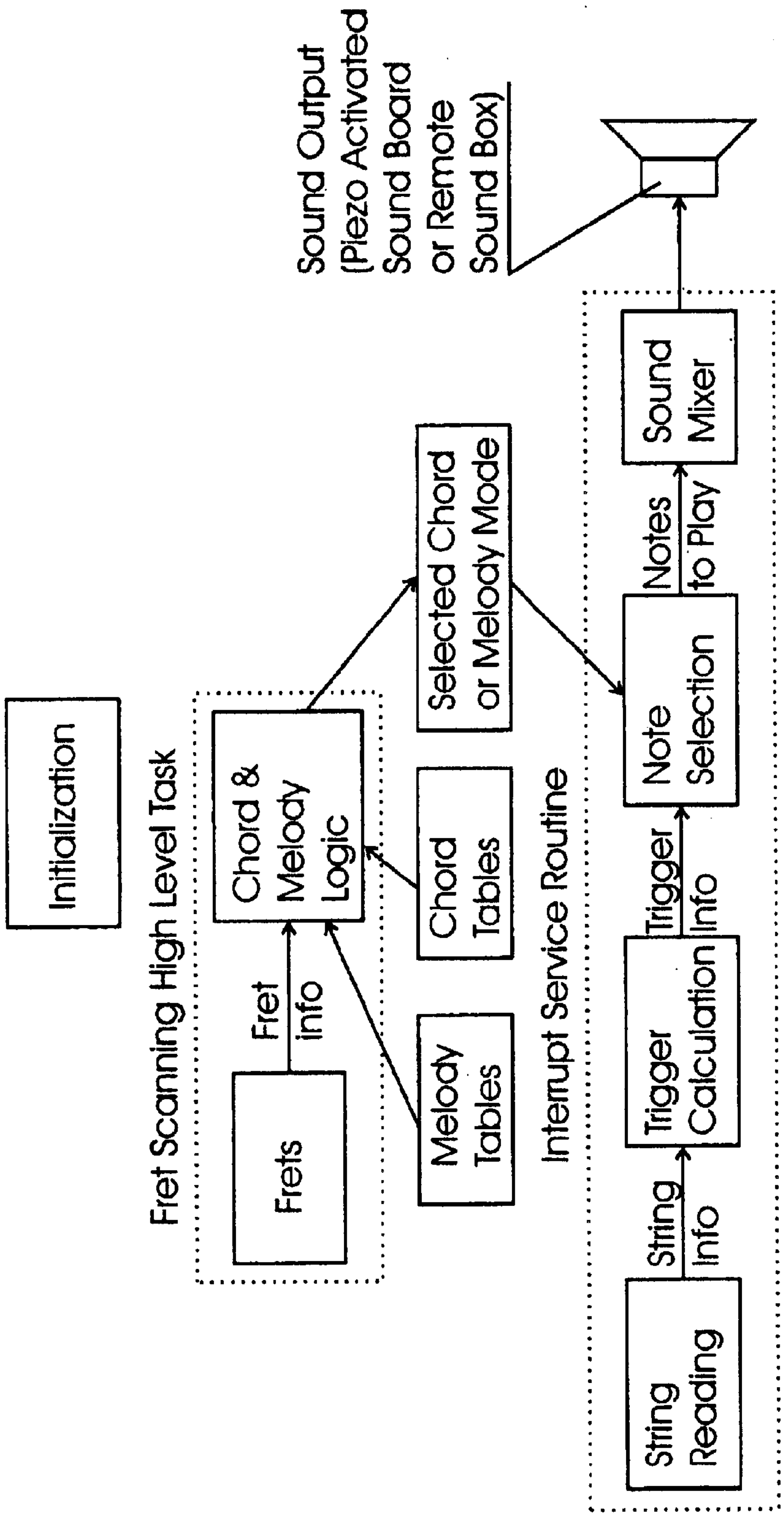
FIG. 5 shows general configuration of the software (code)
Figure 6:
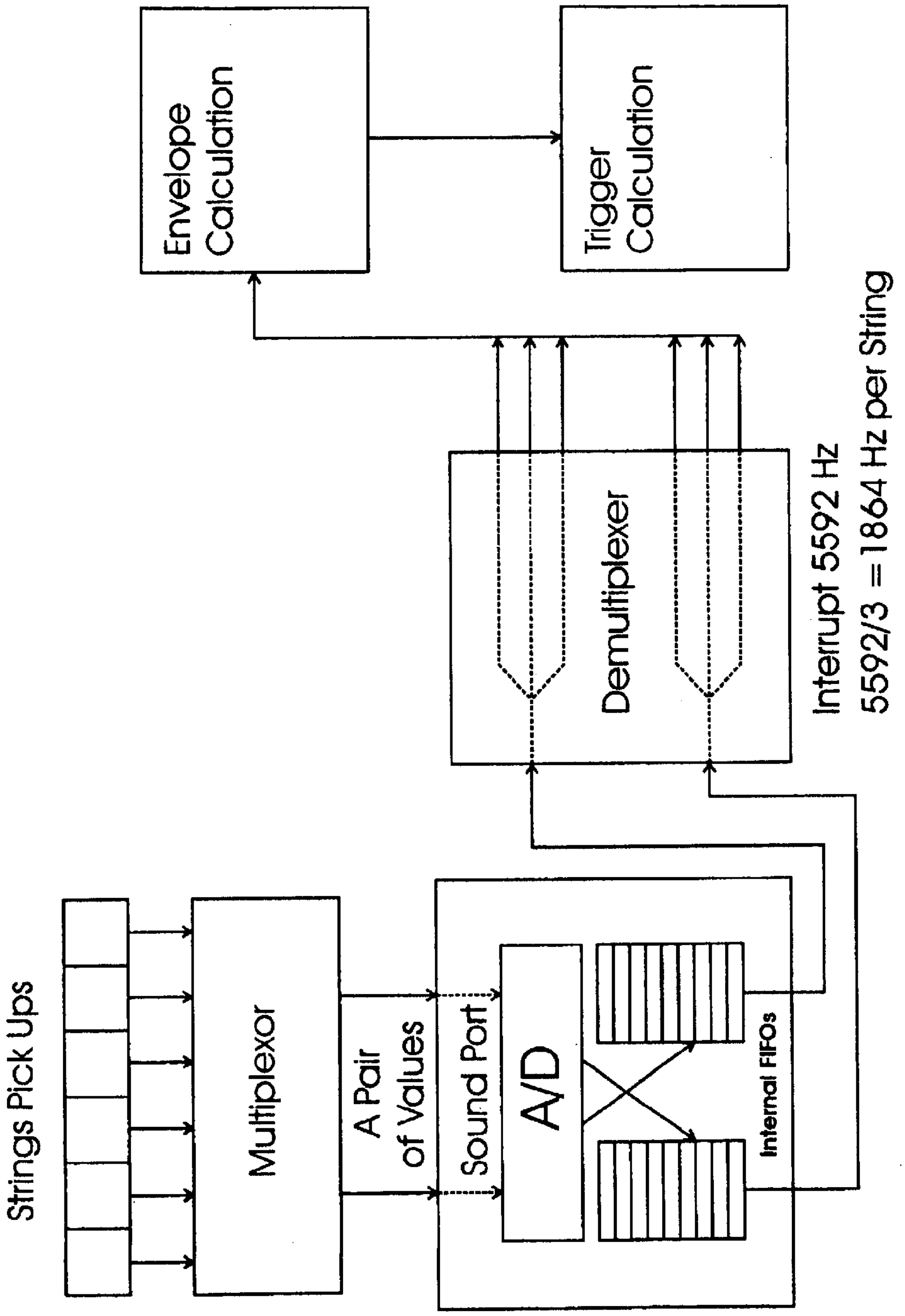
FIG. 6 illustrates low level service routine and strings read timing example.
Figures 7, 8, 9, 10:
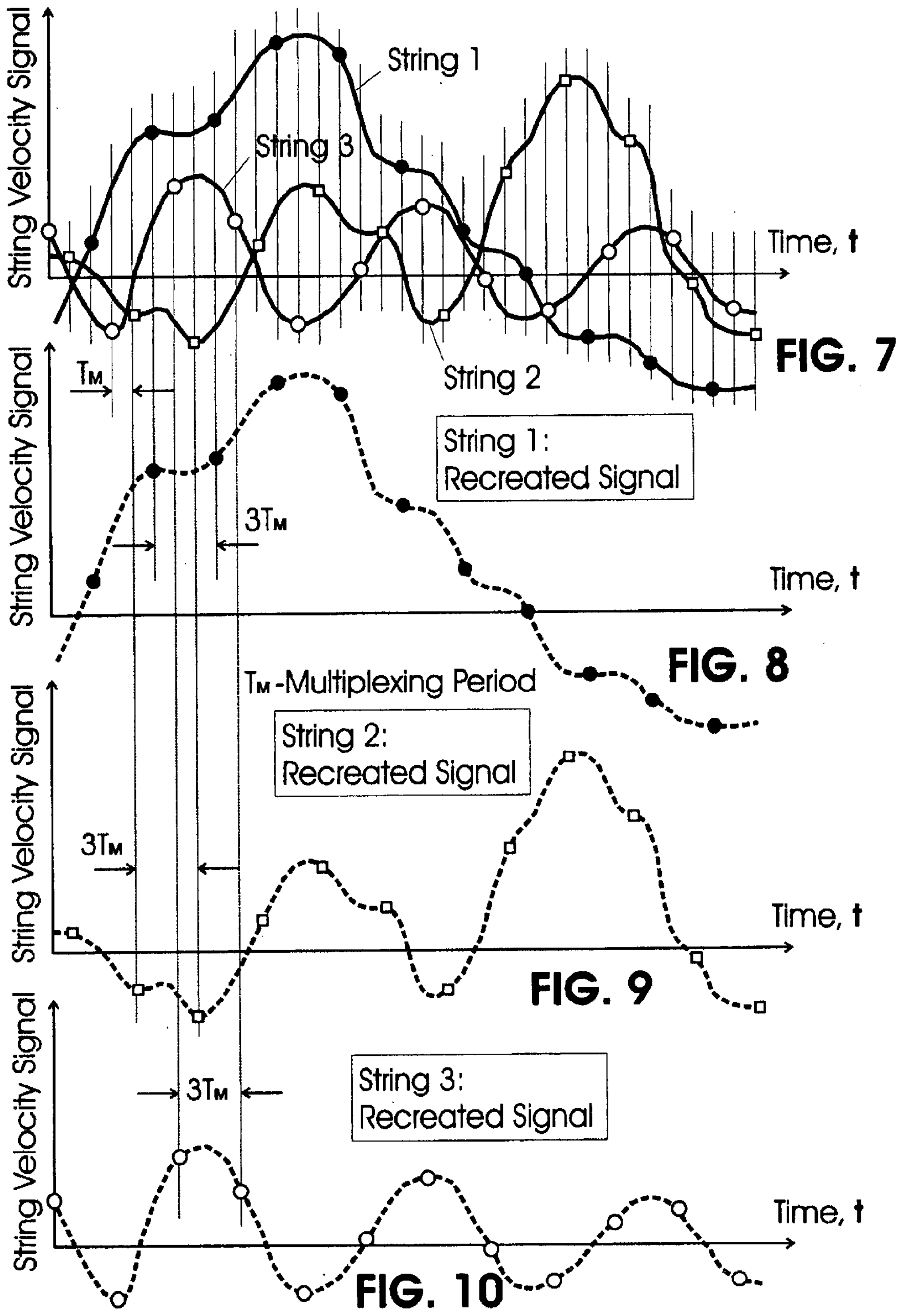
FIGS. 7–10 show the process of multiplexing and recreation of the input signal from the strings after de multiplexing.
Figures 11, 12, 13, 14, 15, 16, 17, 18:
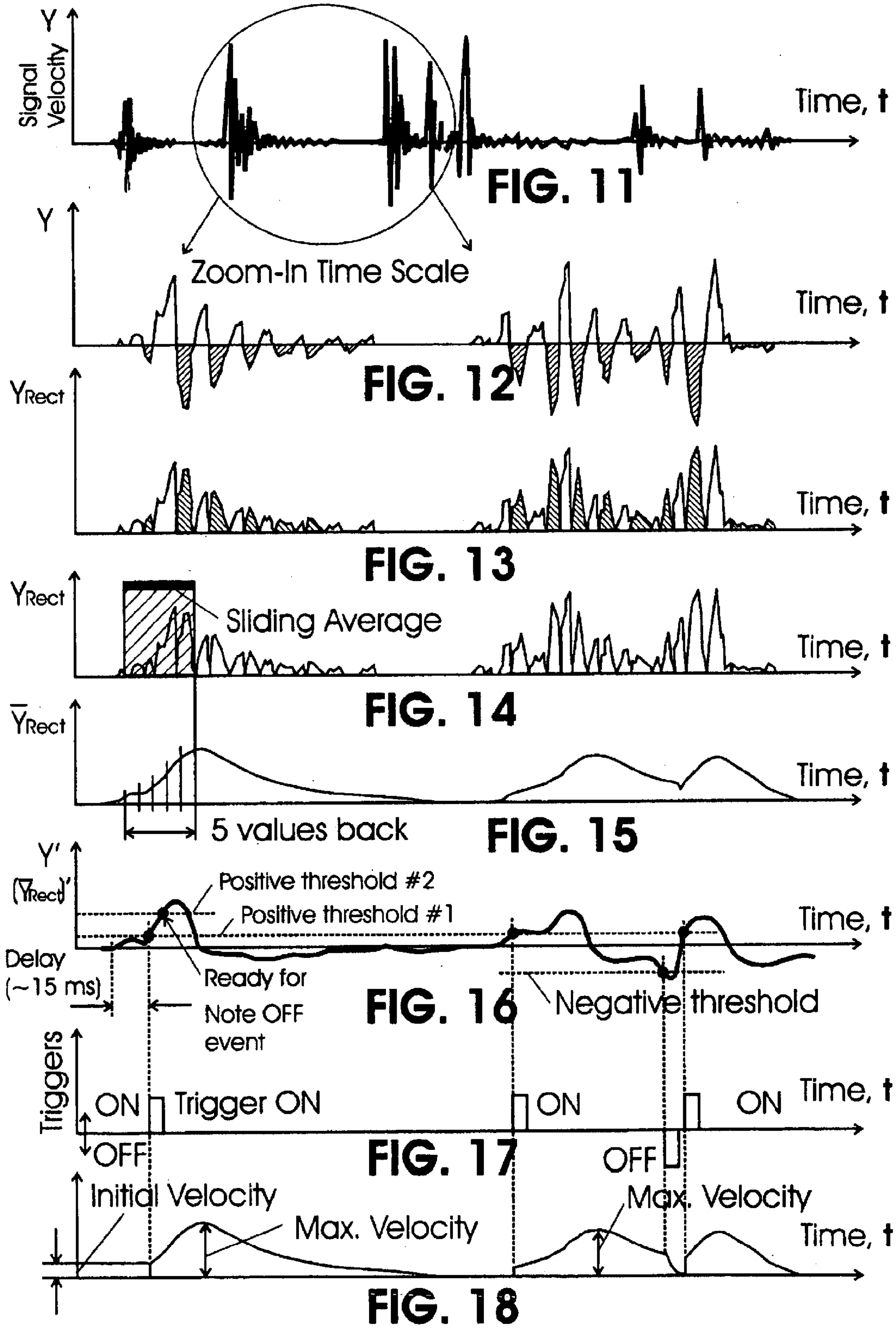
FIGS. 11–18 illustrate an algorithm of processing of the input signal from strings sensors and realization of the note ON-OFF and velocity detection algorithms.

Chord-Melody recognition logic (FIGS. 5, 6) is based on the following algorithm:

Power switch ON
    Self test procedure
    If OK, then mode selector
Device ready:
Default mode:
    If any other mode selected, go there.
Default mode:

A) No finger recognized

All six strings play open string notes upon trigger event from the strings received (E2, A3, D3, G3, B3, E4)

B) At least one finger on a given string recognized

If just one string has finger/s, that string is marked as a melody string.

If melody string is plucked it plays a note as per melody map

If any other/s than a melody string plucked or strummed, those strings produce chord notes as per finger/s position and as per chord map If the period between trigger ON events from any strings is, for instance, within the 0.5 s, the melody string plays a chord note If that time elapses and the melody string is plucked it plays a melody note (If any other than melody string is plucked it always plays a chord note and the delay 0.5 s rule is activated again)

When finger is OFF the string, the previous chord or a note is remembered and can be played upon strumming or plucking unless another fingering is ON.

Alternatively and as a separate option, if no trigger event is coming within 5 s, for instance, the six strings play open notes when plucked or strummed.

When a melody string is plucked first and then another string is plucked, the melody note will sound first and than the other string will play a chord note.

If melody string is plucked again, the melody string will play a chord note unless the 0.5 s delay is exceeded Any other than melody string always produces a chord note.

The basic rule of present melody-chord recognition algorithm is: in order to get a chord, the strumming should not start from the string which has a finger on it (allocated as a melody string or a string higher than other strings used in a fingering combination.) Still as an alternative solution when two (or more) fingers are detected it can be desirable to impose chord mode immediately and not to wait for actual strumming to begin. If move from a chord to playing melody on a melody string faster than 0.5 s desired the finger should be taken OFF the string and plucking should start from the melody string.

Figure 19:
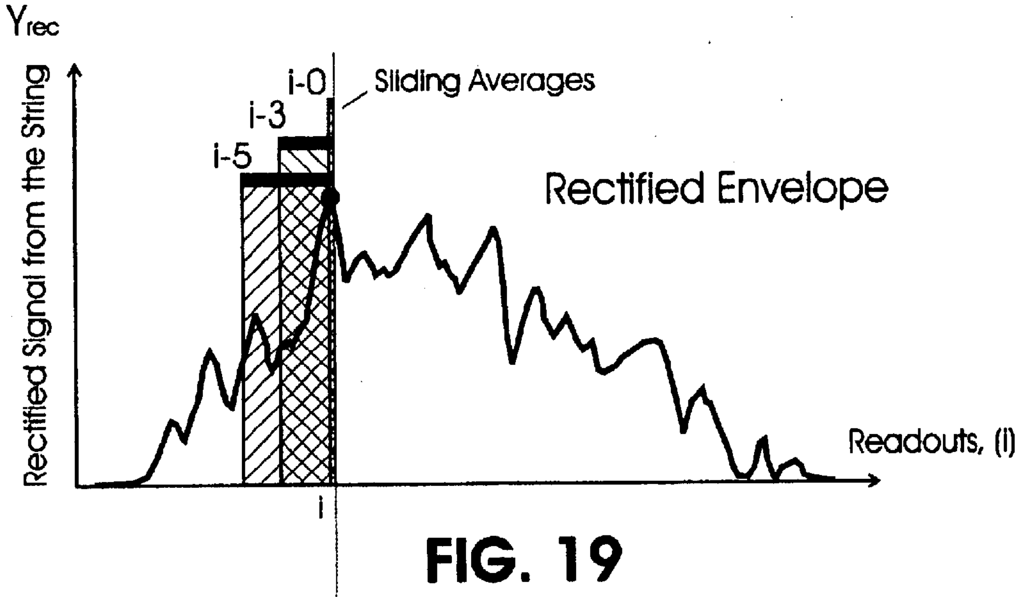
FIGS. 19–20 present an algorithm of "sliding average" applied against the envelope function of input signal from the string.
Figure 20:
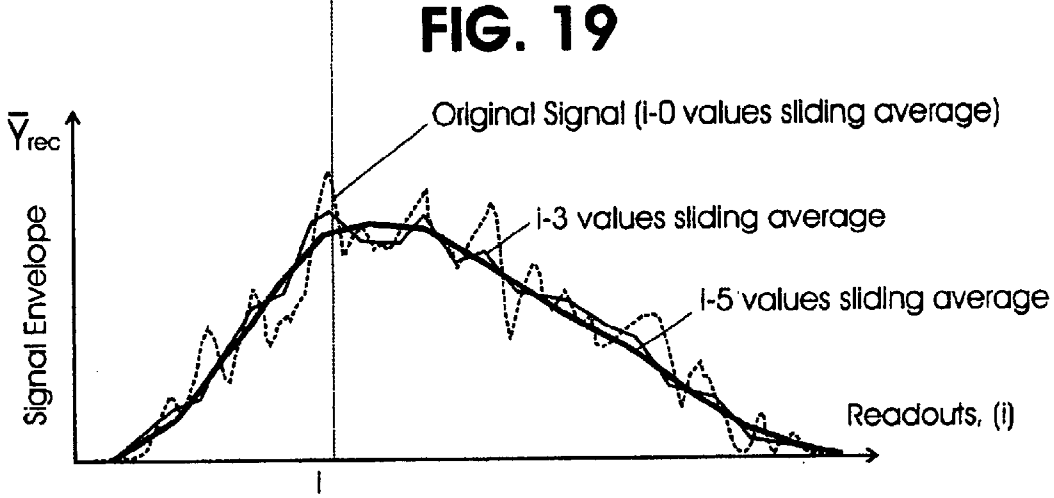
Figure 21:
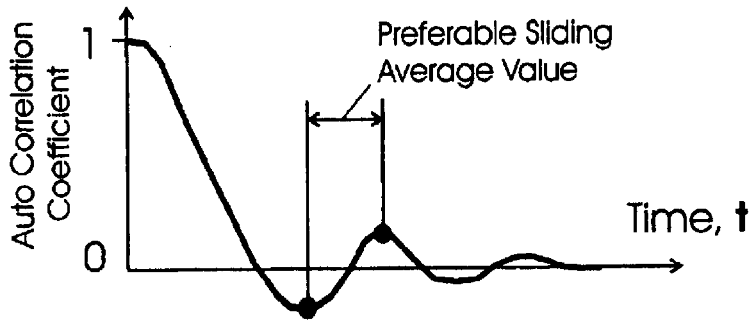
FIG. 21 details autocorrelation technique for determination of preferable "sliding average" period.
Figure 22:
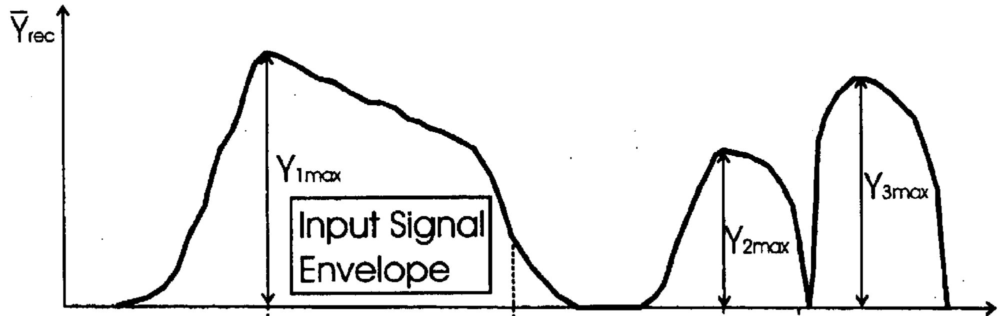
FIGS. 22–26 illustrate greater details of note ON-OFF and note velocity determination.
Figure 23:
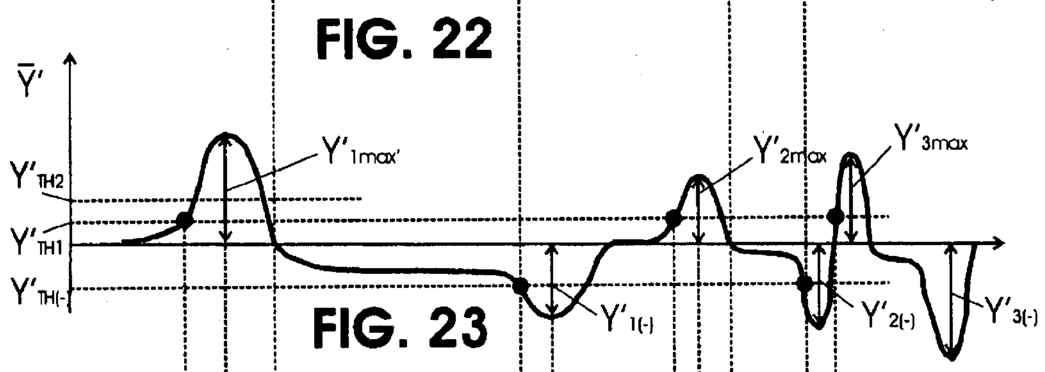
Figure 24:
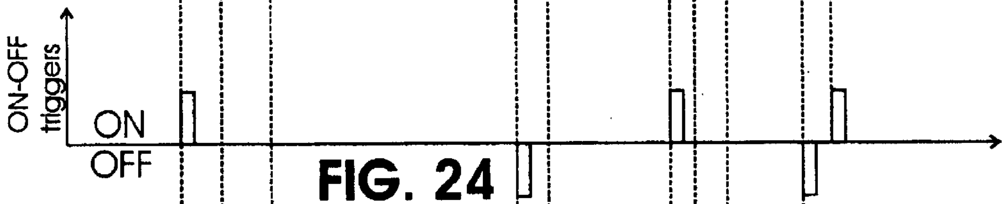
Figure 25:
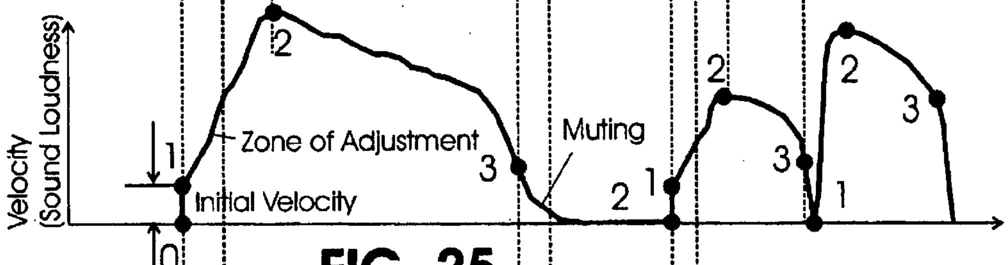
Figure 26:
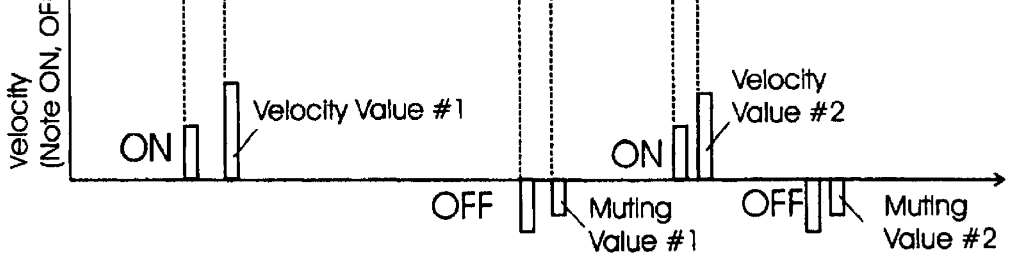
Figure 27:
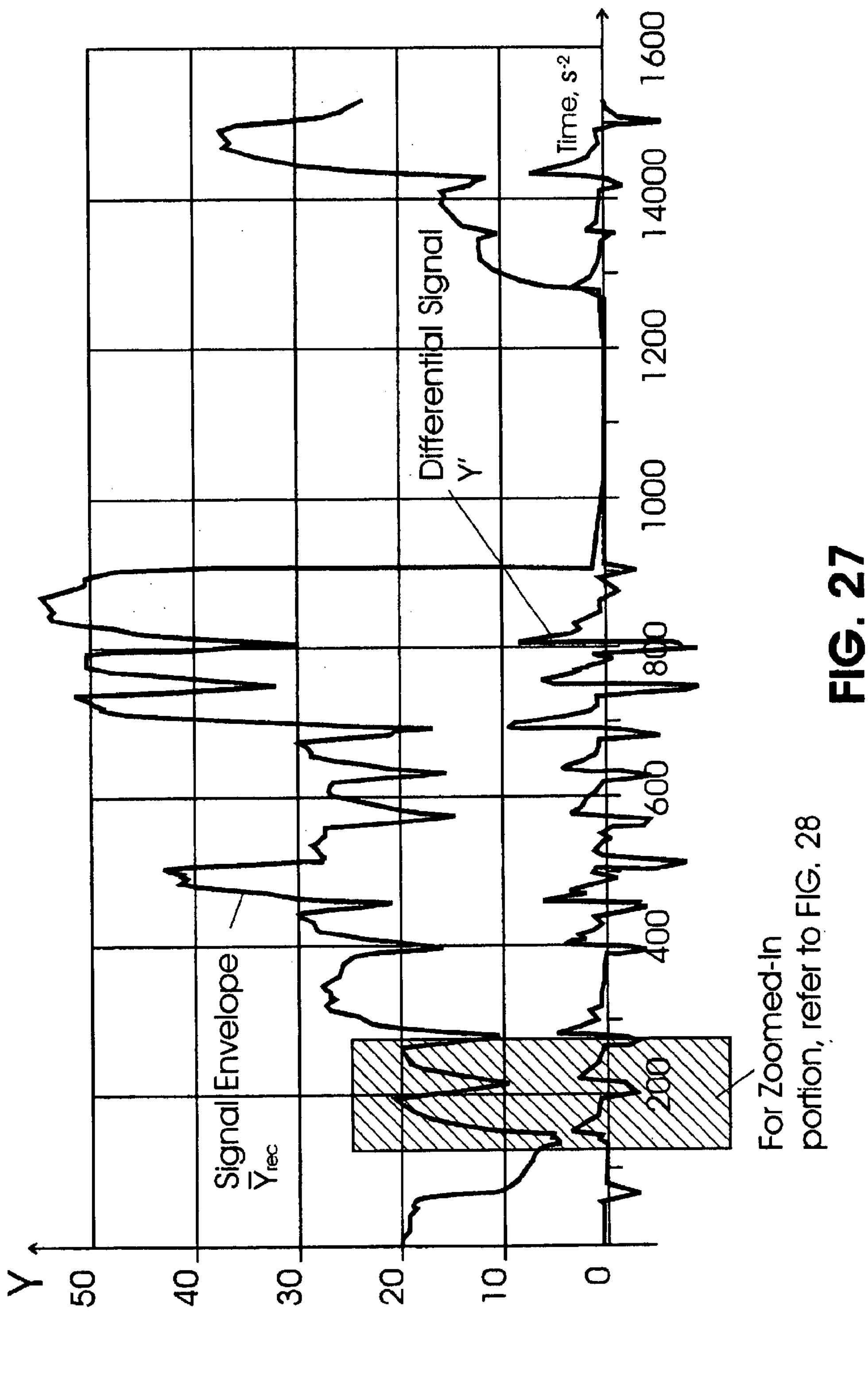
FIG. 27 is a typical plot of string envelope, differential signal and velocity generated by preferred embodiment method.
Figure 28:
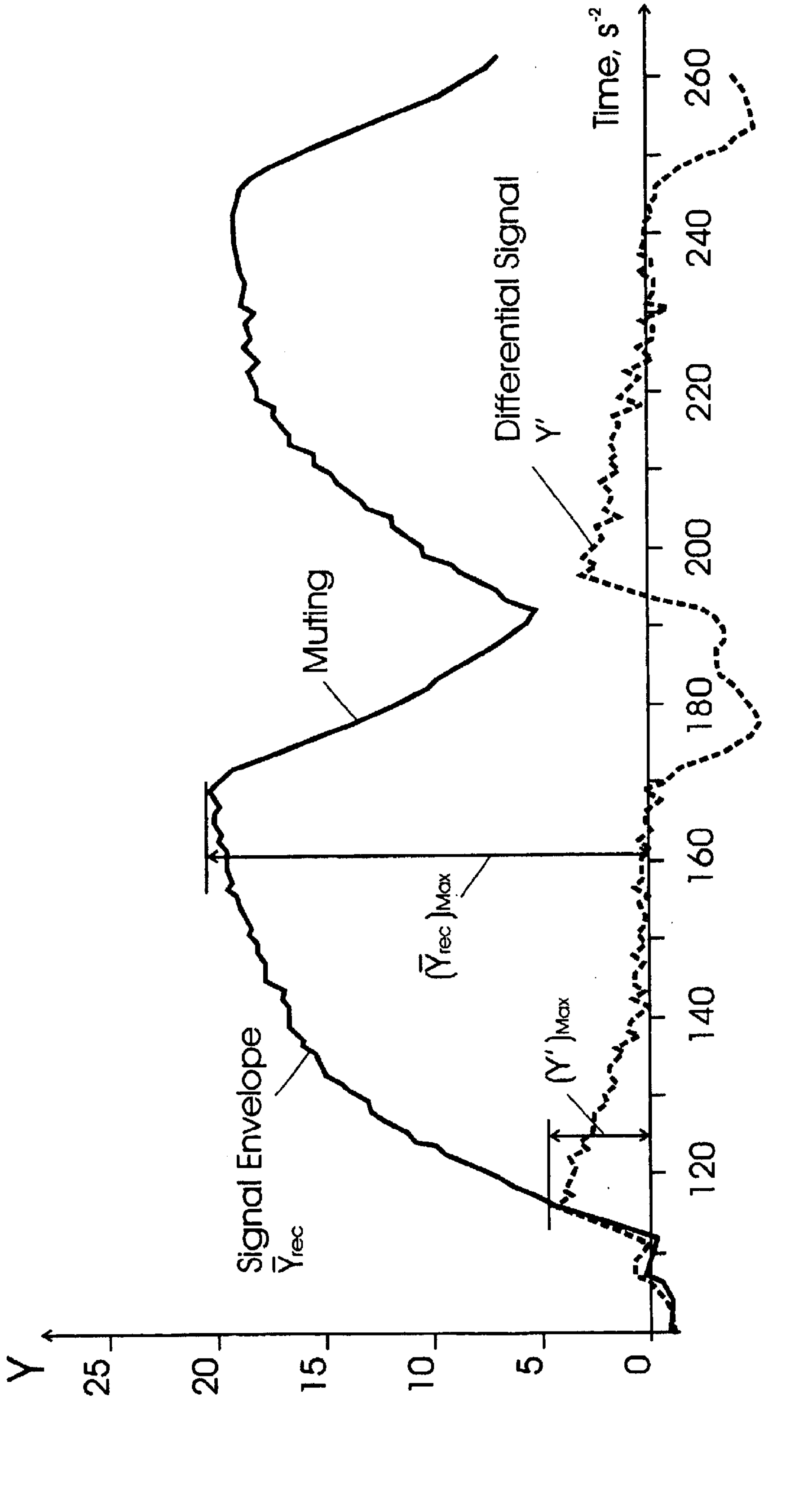
FIG. 28 is a zoomed in fragment of the plot as per FIG. 27.
Figure 29:
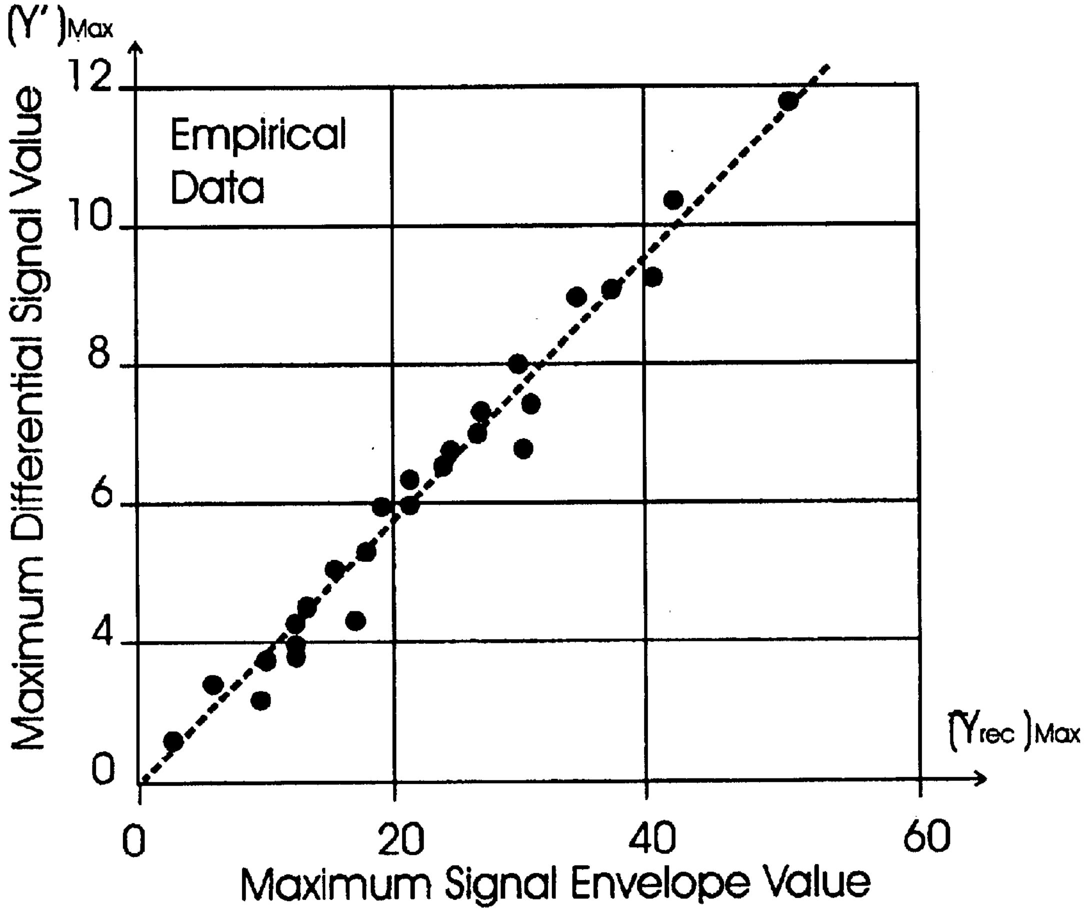
FIG. 29 and FIG. 31 show a correlation between maximum differential signal at attack portion of the envelope and maximum velocity of the string (note)
Figures 30, 31:
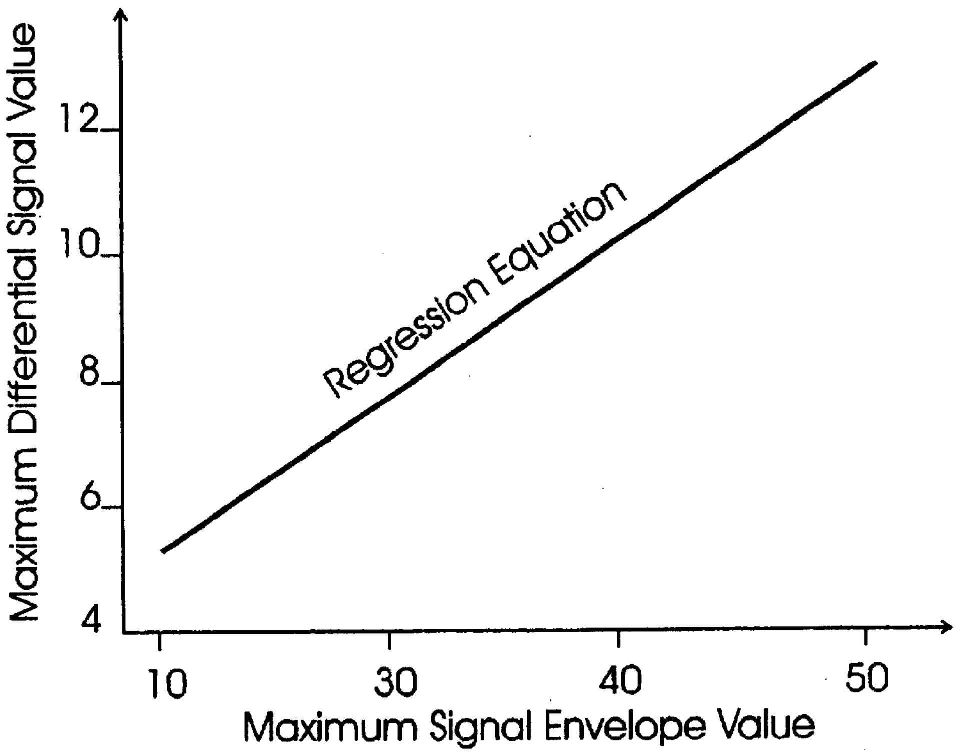
FIG. 30 provides approximate values for input filter cut off frequencies depending on the typical six string guitar setting.
Figure 32:
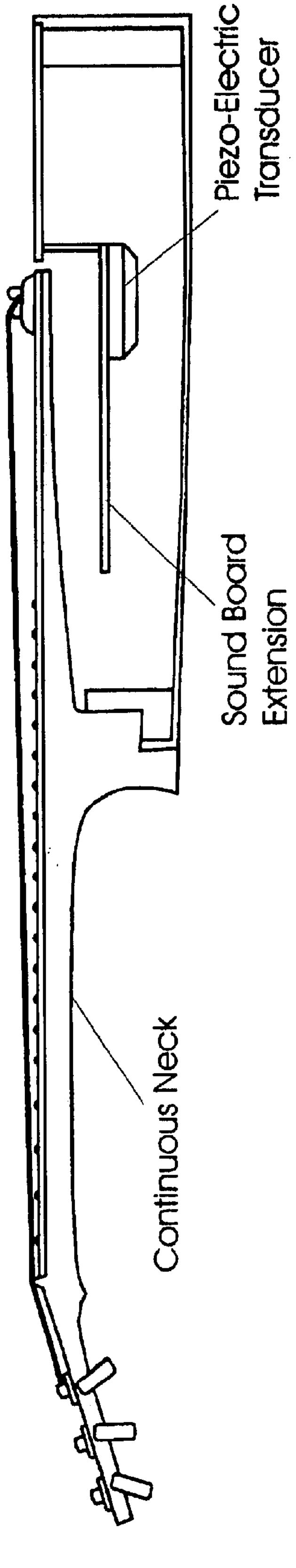
FIG. 32 Presents a cross section of the electronic-acoustic guitar with elongated neck detached from the sound board with optional link between them at the bridge not shown.
Figure 33:
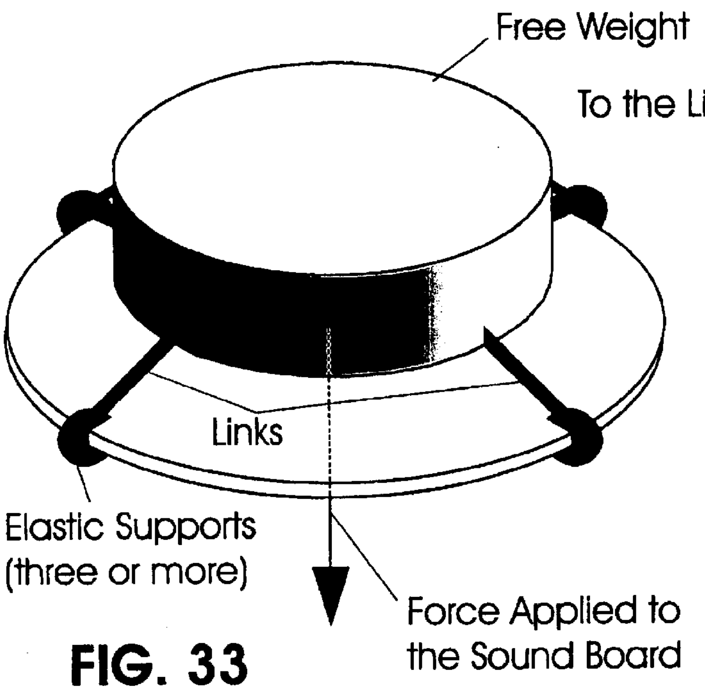
FIGS. 33–35 presents a piezo vibrating bender with free weight as per preferred embodiment.
Figure 34:
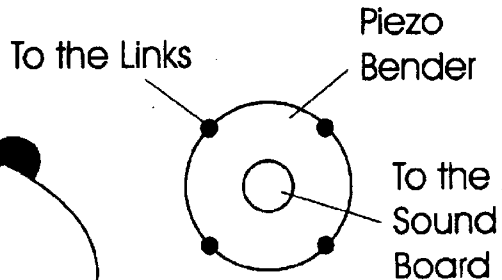
Figure 35:
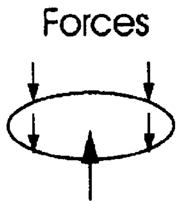
Figure 36:
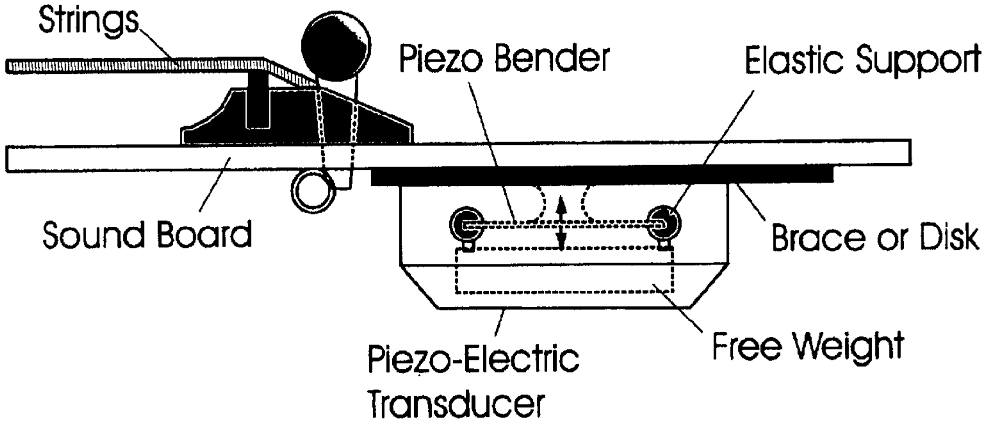
FIG. 36 shows preferred placement of the piezo-electric transducer under the sound board of the acoustic guitar.

Envelope calculation (FIGS. 11–18) according to the algorithm describe is done as follows:

1. Calculation of DC offset level as an average of prior values;
2. Rectification of the signal
3. Calculation of the sliding average (FIGS. 19–21) of the rectified signal The DC level is calculated using sliding average method or formula like $$y_{DCi}=\left(\frac{255}{256}*y_{DC(i-1)}\right)+\frac{y_i}{256}.$$

The signal is then rectified:

$$y_{Rect_i}=abs(y_i-y_{DCi}).$$

The average of rectified signal is calculated, for instance as:

$$\bar{y}_{Rect\,i}=\left((\bar{y}_{Rect(i-1)})*\frac{255}{256}\right)+\frac{y_{Rect\,i}}{256}.$$

The average value calculated is then being passed to the trigger calculation routine where the difference between the current average value and the average several values (for instance, 5) prior to it:

$$y'_i=\bar{y}_{Rect_i}-\bar{y}_{Rect}(i-5)$$

This distance is determined by an auto correlation function of the average value signal and is chosen to avoid false triggers due to variation of the average envelope value signal due to specific behavior of the oscillating string and its interaction with guitar body.

If the calculated difference is bigger than a threshold (FIGS. 22–26) and if there was no difference greater than the threshold in certain number of last calculated differences (for instance, 7), the indicator of the trigger or note ON event is produced. This ensures that the ripple effect has been eliminated where the calculated difference can pass over the threshold and then cross it in negative direction again which would generate multiple triggers.

Velocity or volume calculation in preferable embodiment is done on a fly by playing initially a low volume note as soon as trigger event is detected and then correcting its value until the maximum of average envelope is reached. The volume for each note can be represented for example by a byte with 256 possible values. For each note that is played, the volume is calculated as:

$$\text{“Sample Volume”}=\frac{\text{“Sample Value”}*\text{Volume}}{256}$$

As soon as the trigger (note ON) is detected, the note is first played at a low volume (byte value=10), for instance. The volume is then adjusted for as long as average envelope value increases. If after certain number of envelope values (15, as an example) none of them or a certain number of them or a group of such went down, the adjustment process terminates and the last calculated volume is kept for the remaining duration of the note.

The following steps can illustrate one of the possible algorithms in greater details:

The volume is calculated as $$\text{Volume}=\frac{\text{Envelope}-\text{Threshold}}{\text{Divider}}$$

The divider can be different for every string and it is chosen in a such manner that very strong plucking or strumming provides the volume of 256. If strumming gives stronger input the value still be set to 256. The volume calculated is applied to the note, however if more than a preset number (15) of adjustments were made, the adjustment process stops. It alternatively stops if the maximum of the average envelope value is reached.

It is still possible to use the maximum (FIGS. 27–29, 31) of the difference signal for early maximum envelope value estimation and generation of the fixed velocity, (for instance for providing a MIDI output with minimum delay) or to combine both method in any desirable combination.

That technique provides instant and accurate velocity generation which is very essential for natural playing of the electronic stringed instrument.

The note selection is done as soon as a trigger event received. The note can be a chord note corresponding to the string and specific fingering or a melody note. Timing consideration as previously described are used to determine if a melody or chord note should be played:

If the current string is a melody string and if the time between present and the last time a chord string was strummed is more than a pre set value (0.5 sec, for example), then the melody note is used according to the fingering map for melody scale/s. If the melody note not detected, the chord note is used.

Another method includes watching if there was a change in the fret configuration when a player moved his/her fingers. The melody note can be played then even if the time difference between the chord mode logic even and a melody mode logic event is less than 0.5 sec or other preset amount. This can be actually implemented by setting the time of the last chord as far in the past as last finger combination changes and ensuring that the algorithm will consider that the 0.5 sec has elapsed.

The device as per preferred embodiment can provide up to six notes played simultaneously as determined by the note selection algorithm. The mixing is done based on superposition of the notes to be played simultaneously or one by one if the note OFF trigger event is detected (and events/pointers of the new note ON/OFF/Velocity and its duration received) and before the new note is being played from the memory.

Sound interpolation is further provided based on a special algorithm subject to separate patent application which will follow.

Sound playback is based on data sampled at 20.050 kHz. Specific precautions are made to avoid under run in a playback.

The algorithms, methods and physical devices described and provided herein are for illustration purposes only and should not limit the scope and intentions of present invention. It is also important to note that although specific terms are employed in present application, they are used in a generic and descriptive sense, and not for the purposes of limitation.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An electronic musical instrument for playing chords and melody selections, comprising:

a body having an elongated neck, fret board and strings;

an array of switches operable with said fret board;

a CPU providing digital outputs and inputs for said array of switches and for reading corresponding finger position on said fret board and string vibration sensing means, A/D conversion means for digitizing data from said string sensing means to said CPU;

memory means for storing predetermined notes, said memory means being in electrical communication with said string vibration sensing means and said array of switches;

output means with audio transducer means; and playable by accessing said memory means by actuating said switching arrays end said string sensing means wherein said audio transducer means is connected to a sound box of said body.

2. The electronic musical instrument as set forth in claim 1, wherein said audio transducer means is connected to a sound board of said sound box.

3. The electronic musical instrument as set forth in claim 2, wherein said audio transducer means comprises at least one Piezo-electric bender attached to said sound box by at least one link and to a free weight by at least one other point.

4. The electronic musical instrument as set forth in claim 3, wherein said free weight presents from 5% to 55% of the weight of said sound board.

5. The electronic musical instrument as set forth in claim 1, wherein said memory means include code for recognizing chord/melody status of the strings.

6. The electronic musical instrument as set forth in claim 5, wherein a melody note is assigned to a fingered string which activates said switching array and its vibration status indicates a trigger event.

7. The electronic instrument as set forth in claim 5, wherein a chord notes are assigned to the strings based on the status of said array of switches and if either two strings have fingers thereof or if vibration of unfingered string indicates a trigger event.

8. A method for determining a note ON-OFF trigger event in electronic musical instrument comprised of:

a body having an elongated neck, fret board and strings;

an away of switches operable with said fret board;

a CPU providing digital outputs and inputs for said array of switches and for reading corresponding finger position on said fret board and string vibration sensing moans;

memory means for storing predetermined notes, said memory means being in electrical communication with said string vibration sensing means and said array of switches;

output means with audio transducer means, and comprising the steps of:

determining of absolute values of the signal from a string vibration associated with string velocity;

determining mean values of said signal representing the string vibration envelope and based on averaging of previous absolute values, and determining said trigger event by combining string vibration envelope status and a differential function of said envelope.

9. The method as set forth in claim 8, wherein signals from said strings are multiplexed into a lesser number of channels, digitized and then de-multiplexed to provide digitized envelopes of string vibration.

10. The method as set forth in claim 8, wherein the number of said previous values is between 2 and 10.

11. The method as set forth in claim 8, wherein previous values are counted with different weight ratio ipncreasing toward the most recent values.

12. The method as set forth in claim 8, wherein said trigger event is calculated when the differential function of said envelope crosses a predetermined threshold in a specific direction and remains in that condition for a predetermined period of time.

13. The method as set forth in claim 8, wherein the velocity of said note is determined by a maximum or minimum of the string vibration envelope differential function.

14. The method as set forth in claim 8, wherein note velocity upon receipt of said trigger event is first assigned to its lowest value and then modified until such value starts to increase based on the string vibration envelope value.

* * * * *